United States Patent [19]

Serizawa et al.

[11] Patent Number: 6,037,439
[45] Date of Patent: Mar. 14, 2000

[54] PROCESS FOR CONTINUOUS PRODUCTION OF POLYACETAL RESIN

[75] Inventors: Hajime Serizawa; Kaoru Yamamoto; Kuniaki Kawaguchi; Yuichi Fukui; Tsugio Tenda, all of Fuji, Japan

[73] Assignee: Polyplastics Co., Ltd., Japan

[21] Appl. No.: 09/131,751

[22] Filed: Aug. 10, 1998

[30] Foreign Application Priority Data

Aug. 22, 1997 [JP] Japan .................................. 9-226296

[51] Int. Cl.$^7$ ....................................................... C08G 2/10
[52] U.S. Cl. ............................................. 528/241; 528/249
[58] Field of Search .................................... 528/241, 249

[56] References Cited

U.S. PATENT DOCUMENTS

| | | | |
|---|---|---|---|
| 4,224,435 | 9/1980 | Sugio et al. | 528/232 |
| 4,343,929 | 8/1982 | Sugio et al. | 528/241 |
| 4,681,927 | 7/1987 | Umemura et al. | 528/232 |
| 5,344,911 | 9/1994 | Yamamoto et al. | 528/241 |
| 5,929,195 | 7/1999 | Kawaguchi et al. | 528/233 |

FOREIGN PATENT DOCUMENTS

| | | |
|---|---|---|
| 2-6529 | 1/1990 | Japan . |
| 4-65412 | 3/1992 | Japan . |
| 4-65413 | 3/1992 | Japan . |
| 7-42344 | 5/1995 | Japan . |
| 8-30103 | 3/1996 | Japan . |

*Primary Examiner*—Margaret G. Moore
*Attorney, Agent, or Firm*—Nixon & Vanderhye P.C.

[57] ABSTRACT

To provide a process for stable and continuous production of a polyacetal resin, mainly comprising a copolymer of 1,3-dioxolane and trioxane under the presence of a catalyst, in a high yield on an industrial scale for a long period of time. In the continuous production of a polyacetal resin by mixing 1,3-dioxolane with boron trifluoride and/or a coordination compound of boron trifluoride and then, mixing the obtained mixture with trioxane to conduct bulk polymerization in a polymerization machine, 1,3-dioxolane is brought into contact with boron trifluoride and/or a coordination compound of boron trifluoride while feeding both at the same direction and they are mixed together for 0.1 to 30 seconds under the condition of at least 0.1 m/sec of the linear velocity of the mixture and subsequently mixed with trioxane.

11 Claims, 4 Drawing Sheets

PROCESS FOR CONTINUOUS PRODUCTION OF POLYACETAL RESIN

FIELD OF THE INVENTION

The present invention relates to a process for producing a polyacetal resin, specifically to a process for producing a polyacetal resin at a high yield in an industrial scale stably over a long period of time, even in a continuous way.

DESCRIPTION OF THE RELATED ART

A polyacetal resin is excellent in a balance between such properties as mechanical properties, a chemical resistance and a sliding property, and processing thereof is easy, so that it is widely used as a typical engineering plastic mainly for electric and electronic parts, car parts and other various machine parts. In recent years, as a use range thereof expands, higher performances of the resin are required while it is highly required as well to reduce the cost of the resin as a raw material. Therefore, a production process for obtaining a polyacetal resin at a high yield is required.

In order to obtain a polyacetal resin, especially a copolymerization resin thereof at a high yield, the kinds of catalysts have been investigated, and methods of adding catalysts have been improved. As a typical example, is disclosed in JP-A 2-6529, JP-A 4-65412, JP-A 4-65413, JP-B 7-42344 and JP-B 8-30103, a process for producing a polyacetal copolymerization resin, in which a mixture obtained by contacting cyclic ethers in advance with a polymerization catalyst and mixing them is continuously added to trioxane.

The above conventional methods of mixing cyclic ethers with a polymerization catalyst, in common, as described in or as understood from each prior publication, rarely take into account problems (peculiarities) belonging to the mixing methods themselves. Therefore, a novel and unique mixing process being advantageous in producing a polyacetal resin is not disclosed. Further, to explain in detail, is disclosed in the above publications the descriptions summarized that, since a method of mixing both is particularly not limited, a method of stirring and mixing them after adding a polymerization catalyst with cyclic ethers may be adopted.

There are other descriptions summarized that a method wherein both of feed flows of cyclic ethers and a polymerization catalyst are joined and be mixed in a pipeline may be adopted. As a concrete embodiment of such a mixing method, is illustrated a method in which a feed flow of the catalyst is collisionally contacted at a nearly right angle against the feed flow of cyclic ethers to join and mix them.

However, out of the above conventional methods, the method of stirring and mixing after adding a polymerization catalyst to cyclic ethers can not be preferred in that polydioxolane is usually liable to be side-produced to cause a low yield and have difficulties in a long, stable operation.

Especially, as illustrated in JP-B 8-30103, the method in which the feed flow of the catalyst is collisionally contacted at a nearly right angle against the feed flow of cyclic ethers to join and mix them brings a phenomenon such that a solid or viscous polymer, such as polydioxolane, is liable to be produced at a position where both feed flows are collisionally contacted. The growth of these side-products reduces the areas of a cross section of each feed pipeline, ultimately comes up to a risk of clogging the feed pipelines. The reduction of areas of a cross section of each feed pipeline described above causes changed amounts of feed flow and changed velocity, after all it becomes difficult to continuously produce a polyacetal resin at a high yield in an industrial scale stable over a long period time. Accordingly, this method also can not be preferred under the existing condition.

Although the reason is not obvious why a solid polymer or the like is liable to be produced at a position of a collisional contact, it is important and strongly desired for obtaining stably a polyacetal resin at a high yield to suppress the formation of a polymer of cyclic ether and avoid clogging cased in the pipeline.

SUMMARY OF THE INVENTION

In the light of such existing situation, the present invention is to provide a process for continuously producing of a polyacetal resin mainly comprising 1,3-dioxolane and trioxane under the presence of trioxane, at a high yield in an industrial scale stably over a long period of time.

Intensive researches continued by the present inventors in order to achieve the object described above have resulted in finding that the problems described above can be solved by bringing 1,3-dioxolane into contact in advance with boron trifluoride and/or a coordination compound of boron trifluoride as a catalyst to mix them under a specific condition and then mixing the resulting mixture to trioxane to carry out cationic polymerization and thus have come to complete the present invention.

The invention provides a process for continuously producing a polyacetal resin, comprising the steps of:

(1) feeding 1,3-dioxolane and at least one catalyst of boron trifluoride and a coordination compound of boron trifluoride separately at the same direction as each other to bring them in contact with each other and mix them with each other to obtain a mixture, (2) allowing the mixture to continue for a period of 0.1 to 30 seconds at a linear velocity of at least 0.1 m/sec, (3) then mixing the obtained mixture with trioxane and (4) conducting bulk-polymerization in a polymerization equipment to obtain a copolymer of 1,3-dioxolane and trioxane.

It is preferred that boron trifluoride diluted with an inert gas is fed or the coordination compound of boron trifluoride diluted with an inert solvent is fed.

It is preferred that 1,3-dioxolane diluted with an inert gas is fed.

It is preferred that 1,3-dioxolane is contacted with the catalyst at a temperature of 30 to 100° C.

It is preferred that the mixture of the step (2) is allowed to continuously flow at a temperature of 20 to 100° C. at a linear velocity of 0.3 to 10 m/sec for a period of 0.1 to 5 seconds.

It is preferred that (a) in a first double pipe composed of the internal pipe and the external pipe aligined in parallel to each other so that the internal pipe has been plunged through the external pipe, the catalyst is fed the internal pipe and 1,3-dioxolane is fed through the external pipe;

(b) in a mixture-preparing pipe formed by extending only the external pipe of the first double pipe, the catalyst and 1,3-dioxolane are mixed with each other;

(c) in a second double pipe composed of the internal pipe and the external pipe aligined in parallel to each other so that the internal pipe is the mixture-preparing pipe and has been plunged through the external pipe, the mixture is fed through the internal pipe to the polymerization equipment and trioxane is fed through the external pipe to the polymerization equipment; and (d) the feeding port of the second double pipe is located on the inner wall of the polymerization equipment.

It is preferred that in the step (3) the mixture is added to trioxane fed to the polymerization equipment.

It is preferred that the polymerization equipement is a continuous-wise mixing reactor having biaxial twin screws which rotate at different directions from each other.

In other words, the invention is to a process for the continuous production of a polyacetal resin by mixing 1,3-dioxolane in advance with boron trifluoride and/or a coordination compound of boron trifluoride and mixing the obtained mixture with trioxane to conduct bulk polymerization in a polymerization machine, characterized by bringing 1,3-dioxolane into contact with boron trifluoride and/or a coordination product of boron trifluoride while feeding both at the same direction, mixing them together for 0.1 to 30 seconds under the condition of at least 0.1 m/sec of the linear velocity of the resulting mixture, and then mixing the obtained mixture with trioxane.

It is preferred that the mixture and trioxane are mixed by using a pipeline composed of (a) the first double pipe, of which the internal and the external pipes are formed in parallel by plunging a pipe for feeding boron trifluoride and/or a coordination compound of boron trifluoride into a pipe for feeding 1,3-dioxalane, (b) a pipe for forming and feeding the mixture formed by extending only the eternal pipe of the double pipe, (c) the second double pipe, of which the internal and the external pipes are formed in parallel by plunging a pipe for forming and feeding the mixture into a pipe for feeding trioxane to a polymerization machine, and (d) a feed port formed by locating the end part of the second double pipe on the inner wall of a polymerization machine; and feeding boron trifluoride and/or a coordination compound of boron trifluoride to the internal pipe of the first double pipe and 1,3-dioxolane to the external pipe, then discharging them into the pipe for forming and feeding a mixture to obtain a mixture, and finally feeding the mixture from the internal pipe of the second double pipe and trioxane from the external pipe into a polymerization machine to mix them.

DETAILED DESCRIPTION OF THE INVENTION

The process for producing a polyacetal resin according to the present invention will be explained below.

The polyacetal resin according to the process of the present invention comprises mainly a polyacetal resin copolymer obtained by cationically polymerizing trioxane with 1,3-dioxolane under the presence of boron trifluoride and/or a coordination compound of boron trifluoride as a polymeriaation catalyst.

The basic molecular structure thereof, not specifically being restricted, includes suitably a straight-chain, branched or cross-linked structure and further includes a molecular structure into which a block component is introduced.

A molecular weight or a melt viscosity thereof shall by no means be limited as long as the resin can be molten and molded. If specifically limited, the melt index is 0.1 to 100 g/10 min (in accordance with ASTM D1238).

In the present invention, a mixture of trioxane and 1,3-dioxolanes is used, and the object of using 1,3-dioxolane together is to reduce chains of unstable terminals of a polyactal resin in order to improve qualities of the resin, and to lower the melt-processing temperature in order to improve heat stability of the resin. A polymer comprising only trioxane has such a problem that defects take place in qualities of a polyacetal resin, for example, the deterioration of heat stability.

The amount of 1,3-dioxolane used in the present invention is preferably 0.1 to 20% by weight based on trioxane, particularly preferably 0.3 to 15% by weight to prevent deterioration of a balance between a rigidity and a chemical resistance of the polyacetal resin molded article.

In the production process of the present invention, other chemical components such as components for controlling a molecular weight and components capable of forming a branched or cross-linked structure in addition to the two main raw mateirals can be used in combination.

Examples of the components for controlling a molecular weight include chain transfer agents to prevent form forming no unstable terminals, that is, compounds having alkoxy groups such as methylal, methoxymethylal, dimethoxymethylal, trimethoxymethylal and oxymethylene d-in-butyl ether.

The use amount of the components for controlling a molecular weight preferably dose not exceed 0.5% by weight based on trioxane, particularly preferably not exceed 0.4% by weight, and is generally in the range of 0 to 0.3% by weight for suitable use.

The components capable of forming a branched or cross-linked structure include, for example, ethylene glycol diglycidyl ether, propylene glycol diglycidyl ether, 1,4-bitanediol diglycidyl ether, hexamethylene glycol diglycidyl ether, resorcinol diglycidyl ether, bisphenol A diglycidyl ether, polyethylene glycol diglycidyl ether, polypropylene glycol diglycidyl ether, polybutylene glycol diglycidyl ether, glycerin and derivatives thereof, and pentaerythritol and derivatives thereof.

The use amount of the components capable of forming a branched or cross-linked structure preferably dose not exceed 0.3% by weight based on trioxane, particularly preferably not exceed 0.2% by weight, and is generally in the range of 0 to 0.1% by weight for suitable use.

These other chemical components such as the components for controlling a molecular weight and the components capable of forming a branched or cross-linked structure may be added either to trioxane or 1,3-dioxolane in advance. In that case, they may be once diluted with organic solvents and others, then added.

The boron trifluoride and the coordination compound of boron trifluoride such as boron trifluoride diethyl etherate, boron trifluoride dibutyl etherate, boron trifluoride dioxanate, boron trifluoride acetic anhydride and boron trifluoride triethylamine complex compounds, which are used either alone or in combination in the present invention, are a cationic polymerization catalyst for producing a polyacetal resin mainly comprising 1,3-dioxolane and trioxane.

The preferred use amount thereof is 0.003 to 0.006% by weight based on trioxane in terms of a boron trifluoride-converted amount, more preferably 0.0005 to 0.003% by weight. If the use amount exceeds 0.006% by weight, polydioxolane is liable to be formed at an inside part of the feed pipeline, where the contact begins in the course of contacting and mixing both feed flows, of the mixture of 1,3-dioxolane and the polymerization catalyst according to the method described later and mixing it to cause clogging of the feed pipeline and make the feed flow amount unstable.

On the other hand, if the use amount is less than 0.0003 ppm, it is difficult to obtain the polyacetal resin at a high yield. Accordingly, both cases are not preferred in terms of continuously producing the polyacetal resin at a high yield stably over a long period of time.

The present invention adopts a method in which a polymerization catalyst and 1,3-dioxolane are at first mixed, and then the obtained mixture and trioxane are mixed, not a method in which the above three main components, a polymerization catalyst, 1,3-dioxolane and trioxane, are mixed together according to the known methods.

In this case, in order to carry out a rapid and uniform mixture after 1,3-dioxolane and a polymerization catalyst are contacted and to prevent from foming unusual side reactants due to sudden polymerization of 1,3-dioxolane by a catalyst, the catalyst described above may be once diluted with various inactive fluids, and used.

To put it concretely, when boron trifluoride is used, it may be diluted with inert gas such as nitrogen, and when the coordination compound of boron trifluoride is used, it may be diluted with inactive organic solvents and the like.

Further, 1,3-dioxolane may be diluted with inert gas or inactive solvents, and in particular inert gas is preferably used.

Although the process for producing a polyacetal resin in the present invention is in principle through a known mixing method in which 1,3-dioxolane and boron trifluoride and/or a coordination compound of boron trifluoride are mixed, and then the obtained mixture and trioxane are mixed, but it is specifically characterized by the introduction of a skillful mixing method in which the first double pipe is formed by plunging a feed pipe for boron trifluoride and/or a coordination compound of boron trifluoride into a feed pipe for 1,3-dioxolane, both of the internal and external pipes are kept in parallel to make each feed flow in parallel with both internal and external pipes and at the same direction thereof, and the flows are contacted in parallel each other in a mixing pipe formed by the extended external pipe to advance the mixing, finally the mixture is obtained.

In this case, a static mixer may be used in order to expedite the mixing.

Next, the method of joining a feed flow of trioxane and a feed flow of the above mixture include one in which the second double pipe is formed by plunging a feed pipe for the mixture into a feed pipe for trioxane, and both feed ports of the internal and external pipes are located in the inner wall of a polymerization machine; the feed flow of the mixture is made in the internal pipe and a feed flow of trioxane in the external pipe, and then the mixture and trioxane are simultaneously fed into a polymerization machine to mix them. In other methods, a method in which trioxane is at first fed and flowed in a polymerization machine, then the mixture is fed from a feed port arranged at the downstream of trioxane to mix them is an effective means.

As described above, the method of making a mixed flow by mixing 1,3-dioxolane and boron trifluoride and/or a coordination compound of boron trifluoride in the present invention is one in which each feed flow of these components is made in parallel and the same direction, contacted with each other under that condition, then the mixing is proceeded to prepare the mixture. The temperature of 1,3-dioxolane at the point of the contact described above is specifically not limited, but is preferably controlled in the range of 30 to 100° C. If the temperature is lower than 30° C., it is possible that the catalyst can not show its function of activation. On the other hand, if the temperature exceeds 100° C., it is possible that activation of the catalyst is advanced too much.

It is necessary that the linear velocity of the mixed flow (The concept of the mixed flow contains all flows from the point of beginning the process of mixing after the contact of the above two components.) is more than 0.1 m/sec, particularly preferably in the range of 0.3 to 10 m/sec. If the linear velocity is less than 0.1 m/sec, polydioxolane is liable to be formed in the inside of the feed pipe, where the contact of 1,3-dioxolane and a polymerization catalyst begins, to reduce a section of the feed pipe and make the feed flow unstable, further to cause clogging of the pipe. The problems almost disappear when the linear velocity exceeds 0.3 m/sec. Even if the linear velocity exceeds 10 m/sec, the effect of the invention will not be damaged, but the invention will be liable to lack practical use because a high-speed driving device is needed to set up.

In the step (2) of the method of the invention, the mixture of 1,3-dioxolane and the catalyst may be allowed to stand and flow as it is for a period between 0.1 to 30 seconds or between 0.5 to 300 seconds after the mixing, or contacting with each other, of these two materials, has started, before the subsequent mixing step (3) with trioxane has started. Alternatively, it may be allowed to stand and flow as it is just before a point where self-polymerization of 1,3-dioxolane has started. In particular, it is preferred that the mixture is allowed to flow for 0.1 to 5 seconds.

If the duration is less than 0.1 second, it becomes difficult to obtain a polyacetal resin at a high yield possibly because the degree of mixing the above two components is insufficient and an uneven distribution of each component is occurred. On the other hand, if the duration exceeds 30 seconds, the same happens as the above case that the linear velocity is too low, i.e., polydioxolane is liable to be formed in a particular part of the feed pipe to reduce a section of the feed pipe and make the feed flow unstable, further to cause clogging of the pipe. When the duration is in the range of 5 to 30 seconds, clogging of the pipe is not caused, but a formation of polydioxolane may be shown at the particular part inside the pipe in a certain case. Accordingly, the duration of mixing is particularly preferably in the range of 0.1 to 5 seconds.

The temperature of the mixed flow containing the above two components is preferably maintained in the range of 20 to 100° C. If the temperature is lower than 20° C., the phenomenon that the catalyst can not show its function of activation begins. On the other hand, if the temperature exceeds 100° C., it possibly appears that activation of the catalyst progresses too much as well as the pressure inside the pipe tends to be high.

The mixture and trioxane described above are mixed each other in a polymerization machine to conduct bulk polymerization. To put it concretely, is preferred a method in which each feed port of the second double pipe, formed by plunging a pipe for feeding the mixture into a pipe for feeding trioxane, is located on the inner wall of a polymerization machine, and trioxane mixture from the external pipe of the double pipe and the mixture from the internal pipe are fed into the polymerization machine to mix them. Another method in which trioxane is fed to the upstream of the polymerization machine and the mixture to the downstream to mix both is also preferred.

The mixture in the polymerization machine, all the materials in the course of polymerization and the intermediate reactants are preferably kept at 65 to 135° C.

Neutralization of the polymerization catalyst to a particular degree of polymerization and deactivation thereof are, if necessary, carried out by adding basic compounds or aqueous solutions thereof to the reaction product discharged from the polymerization equipment or the reaction product remaining in the polymerization equipment.

The basic compounds used for neutralizing and deactivating the polymerization catalyst generally include ammonia or amines such as triethylamine, tributylamine, triethanolamine and tributanolamine, hydroxide salts of alkaline metals and alkaline earth metals, and in a certain case other known catalyst deactivators may be used.

Further, stabilization treatment such as decomposition and removal of the unstable terminal parts and masking of the unstable terminals by stabilizing materials is carried out, if necessary, by known methods, and needed various stabilizers are blended. The stabilizers used in the present invention include at least one selected from the group consisting of hindered phenol compounds, nitrogen-containing compounds, hydroxides of alkaline metals or alkaline earth metals, inorganic salts and carboxylic acid salts.

At least one conventional additive for thermoplastic resins selected from the group consisting of, for example, colorants such as dyes and pigments, lubricants, nuclear agents, releasing agents, anti-static agents, surfactants, organic high molecular materials, and inorganic or organic, fibrous, powdery or tabular fillers can be added, if necessary, as long as the effects of the present invention are not damaged.

The polymerization equipment used in the present invention is not particularly restricted as long as it can continuously feed the materials for polymerization, mix them, conduct bulk polymerization and discharge a polymer, but a continuous mixing reactor is necessarily used.

Examples thereof include a polymerization reactor composed of two parallel driving shafts turning at different directions from each other, and each driving shaft is coupled directly with mixing means such as screws, paddles, discs, pins and blades turning along with the inner surface of the cylinder barrel. A kneader, a Ko-kneader type polymerization equipment and a twin screw extruder may be used.

Now, the schematic diagrams of the layouts (FIG. 1 to FIG. 7) containing a polymerization equipment and the pipes thereto attached used in the present invention will illustrate embodiments of the process for producing a polyacetal resin.

Figure 1:
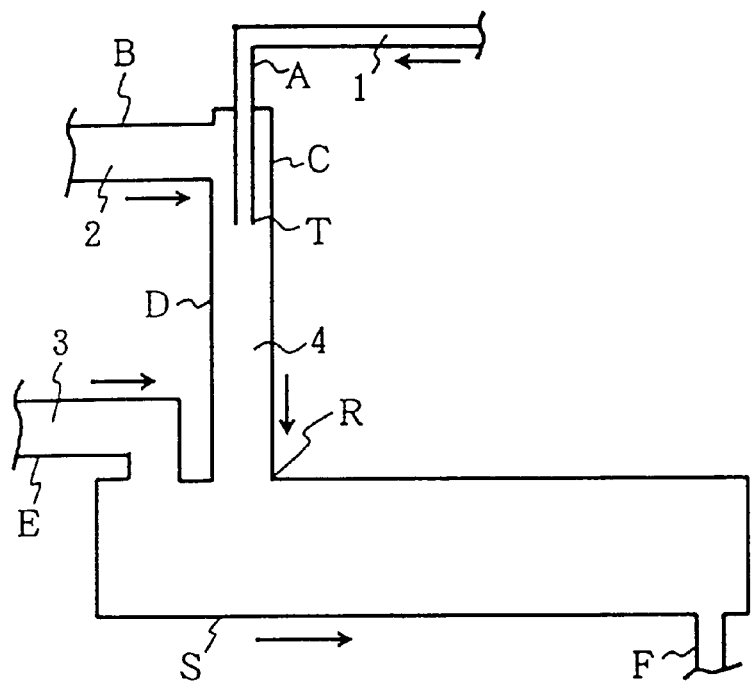
FIG. 1 is a layout showing an equipment for the production process of the invention.

FIG. 1 shows a process for feeding the mixture of boron trifluoride and/or a coordination product of boron trifluoride and 1,3-dioxolane into a feed flow of trioxane fed from an end of the polymerization equipment to conduct polymerization, and continuously discharging a polyacetal resin from the other end of the polymerization equipment.

More Specifically, the first double pipe comprising the parallel internal and external pipes is formed by plunging a feed pipe (A) for boron trifluoride and/or a coordination compound of boron trifluoride (1) to feed in the direction indicated by an arrow into a feed pipe (B) for 1,3-dixolane (2) to feed in the direction indicated by an arrow; the internal pipe of the double pipe is not extended but left its port end (T), and the external pipe is extended to form a mixing and feeding pipe (D) for contacting, mixing and feeding the feed flow of the above (1) and (2); the end port (R) of the pipe (D) is located on the inner wall of a polymerization machine (S) in which the materials for polymerization flow in the direction indicated by an arrow, and a feed pipe (E) for trioxane to feed in the direction indicated by an arrow is further located at the upstream of the polymerization machine in the same manner as described above; a pipe (F) for continuously discharging a bulk polymer of polyacetal resin is located in the downstream of the polymerization machine.

It is an essential factor that the above-described internal and external pipes of the double pipe are in parallel. It is one of the preferable embodiments that they have a coaxial shaft, but not indispensable. The double pipe of the present invention does not include the multiplex pipe having three or more internal or external pipes, but includes ones having some parallel internal pipes in an external pipe. Accordingly, it is a preferred embodiment that the internal pipe is divided into some pipes in an external pipe to expedite the mixing of the parallel feed flows.

Next, the process for producing a polyacetal resin will be outlined. Boron trifluoride and/or a coordination product of boron trifluoride (1) is flowed in the direction of an arrow in the feed pipe (A) to discharge from the port end (T), and 1,3-dixolane (2) is flowed in the direction of an arrow in the feed pipe (B); as the first double pipe (C) is formed by the parallel internal and external pipes, both (1) and (2) flow at the same direction and parallel at least up to the port (T); Passing through the port (T) into the mixing and feeding pipe (D), this parallel flows are not immediately disordered, but is first contacted under the parallel condition and gradually dispersed to the orthogonal direction of the flow to mix them; after continuously mixing for the particular seconds, the substantially uniform mixture (4) is obtained. The mixture (4) flows in the direction of the arrow and is fed from the end port (R) of the feed pipe (B) into the polymerization machine (S).

On the other hand, trioxane (3) is fed from the feed pipe (E) into the polymerization machine (S), and flows in the direction of the arrow in the machine to mix a catalyst and both material monomers; the mixture is bulk polymerized to be a polyacetal resin, which is discharged form the pipe (F) of the machine.

Figure 2:
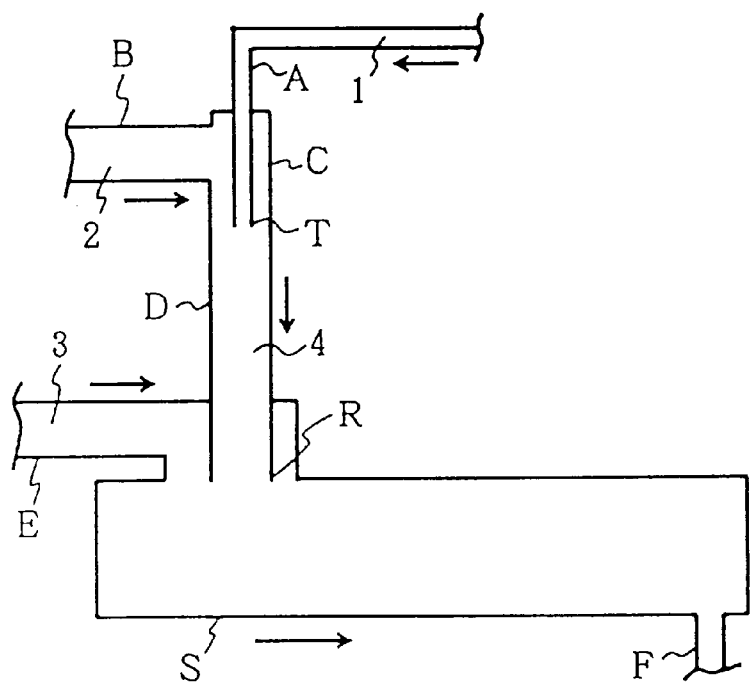
FIG. 2 is another layout showing an equipment for the production process of the invention.

FIG. 2 is the same layout and has the same marks as FIG. 1, except that the second double pipe is formed by plunging the mixing and feeding pipe (D) in FIG. 1 into the feed pipe (E) for trioxane and both ends of the double pipe are located on the inner wall of the polymerization machine.

A process for producing a polyacetal resin is the same as the case FIG. 1, except that the feed flow of trioxane (3) from the external pipe of the double pipe and the mixture (4) from the internal pipe are fed simultaneously into the polymerization machine to immediately conduct mixing and polymerization.

Figure 3:
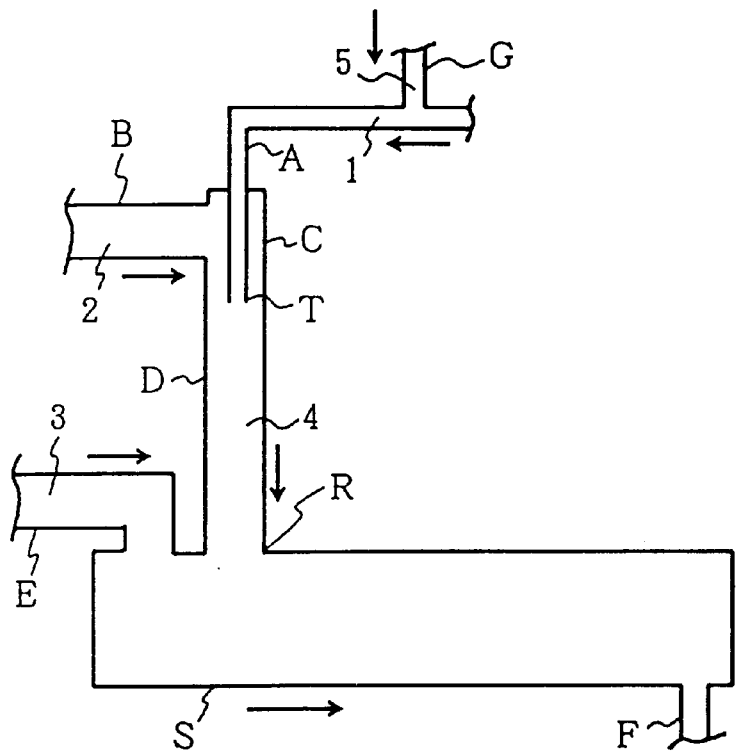
FIG. 3 is still another layout showing an equipment for the production process of the invention.

FIG. 3 is the same layout and has the same marks as FIG. 1, except that the feed pipe (A) for boron trifluoride and/or a coordination product of boron trifluoride (1) in FIG. 1 is annexed with a feed pipe (G) for inert gas or inactive solvents (5).

A process for producing a polyacetal resin is the same as the case FIG. 1, except that boron trifluoride and/or the coordination compound of boron trifluoride (1) diluted with inert gas or inactive solvents (5) is used to feed.

Figure 4:
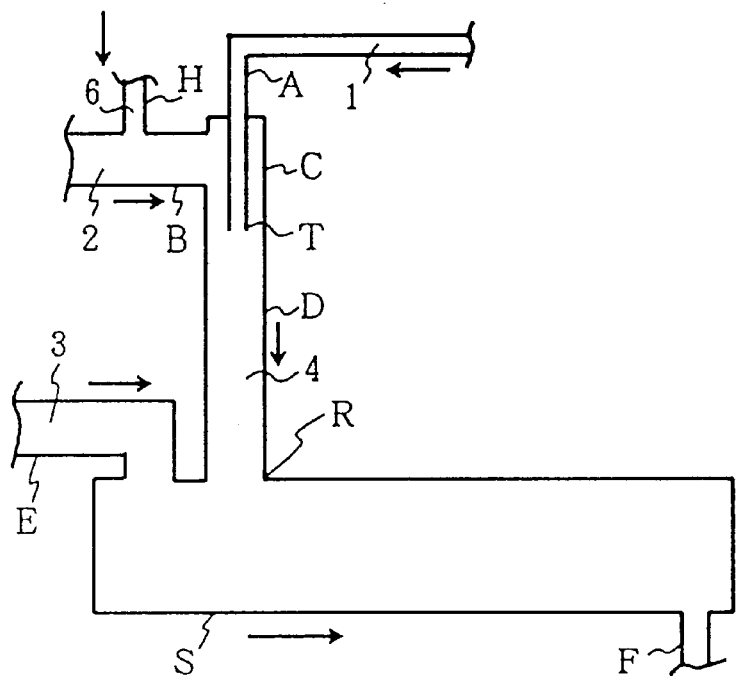
FIG. 4 is still another layout showing an equipment for the production process of the invention.

FIG. 4 is the same layout and has the same marks as FIG. 1, except that the feed pipe (B) for 1,3-dioxolane (2) in FIG. 1 is added with a feed pipe (H) for inert gas or inactive solvents (6).

A process for producing a polyacetal resin is the same as the case FIG. 1, except that 1,3-dioxolane (2) diluted with inert gas or inactive solvents (6) is used to feed.

Figure 5:
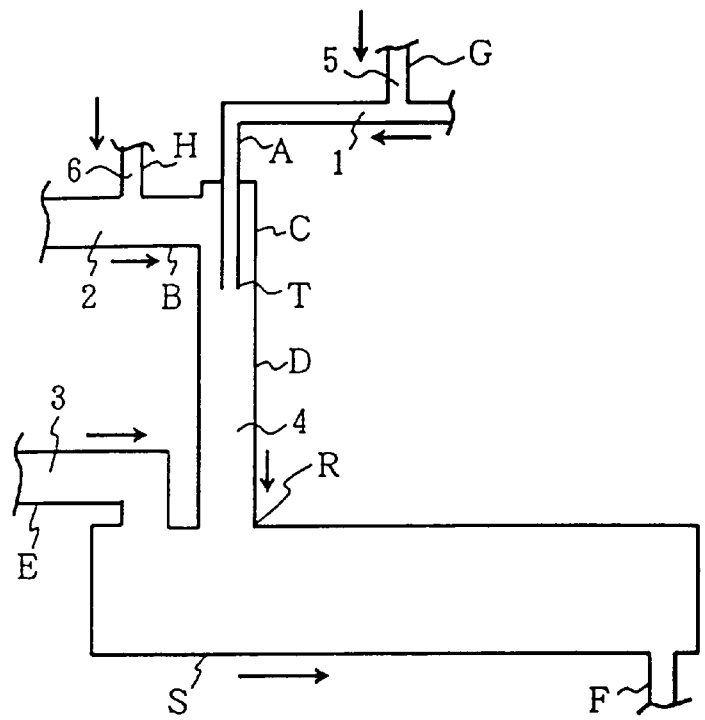
FIG. 5 is still another layout showing an equipment for the production process of the invention.

FIG. 5 is the same layout and has the same marks as FIG. 1, except that the feed pipe (A) for boron trifluoride and/or the coordination compound of boron trifluoride (1) and the feed pipe (B) for 1,3-doioxolane (2) in FIG. 1 are both annexed with the feed pipes (G) and (H) for inert gas or inactive solvents (5) and (6) shown in FIG. 3 and FIG. 4, respectively.

A process for producing a polyacetal resin is the same as the case FIG. 1, except that boron trifluoride and/or the coordination product of boron trifluoride (1) diluted with inert gas or inactive solvents (5) and 1,3-dioxolane (2) diluted with inert gas or inactive solvents (6) are used to feed.

Figure 6:
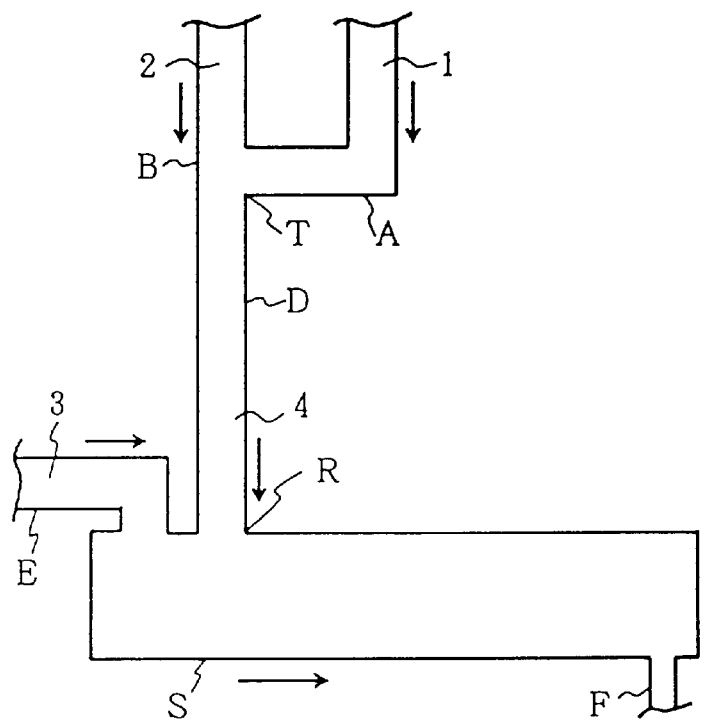
FIG. 6 is a layout showing an equipment for the conventional production process.

FIG. 6 is a schematic diagram of a layout containing a conventionally used polymerization machine and the pipes thereto attached, but it is the same layout and has the same marks as FIG. 1, except for using a mixing and feeding pipe formed by that each feed pipe for boron trifluoride and/or a coordination compound of boron trifluoride (1) and 1,3-dioxolane (2) is attached almost at a right angle against the feed flow of trioxane (3) fed form the end of the polymerization machine.

A process for producing a polyacetal resin is the same as the case FIG. 1, except that 1,3-dioxolane (2) is fed almost at a right angle against boron trifluoride and/or the coordination compound of boron trifluoride (1) to drastically contact and mix them.

Figure 7:
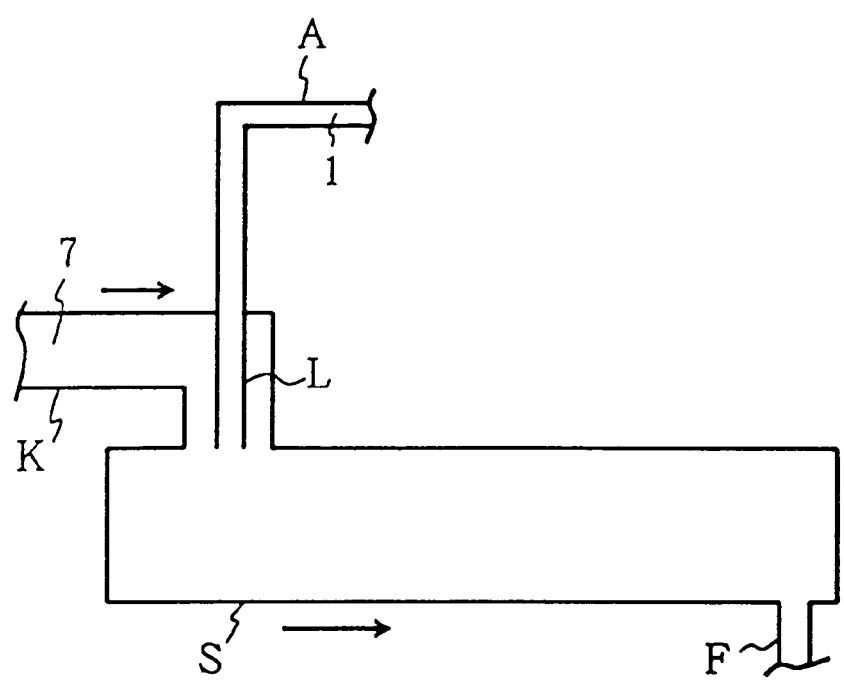
FIG. 7 is another layout showing an equipment for the conventional production process.

FIG. 7 is another schematic diagram of a layout containing a conventionally used polymerization machine and the pipes thereto attached, in which the second double pipe is formed by plunging a feed pipe (L) for boron trifluoride and/or the coordination compound of boron trifluoride (1) into a feed pipe (K) for feeding in the direction of the arrow, trioxane (3), 1,3-dioxaolane (2) and the mixture of molecular weight controlling agent of methylal (7), and attached to the polymerization machine (S) in the same manner as the first double pipe.

A process for producing a polyacetal resin is one in which the feed flow of the mixture of the three components and the feed flow of boron trifluoride and/or the coordination product of boron trifluoride (1) are separately fed into the polymerization machine (S).

According to the process for continuous production of a polyacetal resin in the present invention, a polyacetal resin can be obtained at a high yield in an industrial scale stably over a long period of time. Further, the polyacetal resin obtained in the present invention is excellent in a balance between such properties as mechanical properties, a chemical resistance, a sliding property as well as a conventional polyacetal resin is, and excellent in a molding processability so that it is useful in various fields such as infection-molded articles, extrusion-molded articles, blow-molded articles, foaming-molded articles and the like.

EXAMPLES

The present invention will specifically be explained below, but the present invention will by no means be restricted to these examples.

Example 1

According to the schematic process diagram shown in FIG. 1, production of a polyacetal resin was conducted. First, with use of a continuous mixing reactor (an embodiment of the polymerization machine (S) shown in FIG. 1) equipped with a jacket for passing a heating (cooling) medium on the outside and composed of a barrel, in which a cross section is of such a form that two circles are partially superposed, and rotational shafts equipped with paddles, trioxane (3) mixed with a molecular weight-controlling agent was continuously fed from the pipe (E) at the upstream end of the polymerization machine (S) while rotating two rotational shafts equipped with paddles at 50 rpm at different directions from each other. Methylal was used as a molecular weight-controlling agent and added in an amount of 0.034% by weight, based on trioxane.

On the other hand, the amount equivalent to 3.0% by weight per trioxane of 1,3-dioxolane (2) heated at 60° C. was fed from the feed pipe (B) and the amount equivalent to 0.0017% by weight per trioxane of boron trifluoride (1) was fed from the feed pipe (A). Both flows were directed at the same direction in the passageway of the first double pipe (C), and at the linear velocity of 1.1 m/sec through the port (T) of the internal pipe into the succeeded mixing and feeding pipe (D) to obtain the mixture (4) by mixing for 1.2 seconds before contacting trioxane (3) in the poymerization machine. The mixture (4) was heated at 64° C., continuously fed from the feed port (R) to the polymerization machine (S), and then cationic bulk polymerization was conducted. Continuous operation was carried out for 36 hours to find that polydioxolane liable to be produced in the pipeline, especially in the port end (T), was not observed and the pipeline could be prevented from being clogged. Further, the amounts in feed flow of 1,3-dioxolane (2) and boron trifluoride (1) always showed constant values, and the polyacetal resin could stably be produced.

The reaction product discharged from the port (F) for discharging a polyacetal resin was, quickly passing through a crusher, added to an aqueous solution of 0.05% by weight of triethylamine adjusted at 60° C., and crushed into particles while deactivating the catalyst. Further, the crushed product was separated, washed and dried, and then a polyacetal resin was obtained. The polymerization yield showed as high value as 81% by weight based on the fed raw materials.

Example 2

According to the schematic process diagram shown in FIG. 2, production of a polyacetal resin was conducted. First, with use of a continuous mixing reactor (an embodiment of the polymerization machine (S) shown in FIG. 2) equipped with a jacket for passing a heating (cooling) medium on the outside and composed of a barrel, in which a cross section is of such a form that two circles are partially superposed, and rotational shafts equipped with paddles, trioxane (3) mixed with a molecular weight-controlling agent was continuously fed from the pipe (E) at the upstream end of the polymerization machine (S) while rotating two rotational shafts equipped with paddles at 50 rpm at different directions from each other. Methylal was used as a molecular weight-controlling agent and added in an amount of 0.034% by weight, based on trioxane.

On the other hand, the amount equivalent to 3.0% by weight per trioxane of 1,3-dioxolane (2) heated at 60° C. was fed from the feed pipe (B) and the amount equivalent to 0.0017% by weight per trioxane of boron trifluoride (1) was fed from the feed pipe (A). Both flows were directed at the same direction in the passageway of the first double pipe (C), and at the linear velocity of 1.1 m/sec through the port (T) of the internal pipe, into the succeeded mixing and feeding pipe (D) to obtain the mixture (4) by mixing for 1.2 seconds before contacting trioxane (3). The mixture (4) was heated at 64° C., continuously fed through the internal pipe of the second double pipe to the feed port (R) to the polymerization machine (S), and simultaneously trioxane (3) was fed from the feed pipe (E) of the external pipe of the double pipe, then cationic bulk polymerization was conducted in the polymerization machine.

Continuous operation was carried out for 36 hours to find that polydioxolane liable to be produced in the pipeline, especially in the port end (T), was not observed and the pipeline could be prevented from being clogged. Further, the amounts in feed flow of 1,3-dioxolane (2) and boron trifluoride (1) always showed onstant values, and the polyacetal resin could stably be produced.

The reaction product discharged from the port (F) for discharging a polyacetal resin was treated in the same manner as Example 1, and the catalyst was deactivated. Further, the crushed product was separated, washed and dried, and then a polyacetal resin was obtained. The polymerization yield showed as high value as 81% by weight based on the fed raw materials.

Example 3

According to the schematic process diagram shown in FIG. 3, production of a polyacetal resin was conducted. First, with use of a continuous mixing reactor (an embodiment of the polymerization machine (S) shown in FIG. 3) equipped with a jacket for passing a heating (cooling) medium on the outside and composed of a barrel, in which a cross section is of such a form that two circles are partially superposed, and rotational shafts equipped with paddles, trioxane (3) mixed with a molecular weight-controlling agent was continuously fed from the pipe (E) at the upstream end of the polymerization machine (S) while rotating two rotational shafts equipped with paddles at 50 rpm at different directions from each other. Methylal was used as a molecular weight-controlling agent and added in an amount of 0.034% by weight, based on trioxane.

On the other hand, the amount equivalent to 3.0% by weight per trioxane of 1,3-dioxolane (2) heated at 60° C. was fed from the feed pipe (B) and the amount equivalent to 0.0017% by weight per trioxane of boron trifluoride (1) diluted with inert nitrogen gas fed from the feed pipe (G) at the dilution ratio of 8.9 vol/vol, was fed from the feed pipe (A). Both flows were controlled at the same direction in the passageway of the first double pipe (C), and at the linear velocity of 3.1 m/sec through the port (T) of the internal pipe, into the succeeded mixing and feeding pipe (D) to obtain the mixture (4) by mixing for 0.5 second before contacting trioxane (3). The mixture (4) was heated at 64° C., continuously fed from the feed port (R) to the polymerization machine (S), and then cationic bulk polymerization was continuously conducted.

Continuous operation was carried out for 48 hours to find that polydioxolane liable to be produced in the pipeline, especially in the port end (T), was not observed and the pipeline could be prevented from being clogged. Further, the amounts in feed flow of 1,3-dioxolane (2) and boron trifluoride (1) always showed constant values, and the polyacetal resin could stably be produced.

The reaction product discharged from the port (F) for discharging a polyacetal resin was treated in the same manner as Example 1, and the catalyst was deactivated. Further, the crushed product was separated, washed and dried, and then a polyacetal resin was obtained. The polymerization yield showed as high value as 80% by weight based on the fed raw materials.

Example 4

According to the schematic process diagram shown in FIG. 4, production of a polyacetal resin was conducted. First, with use of a continuous mixing reactor (an embodiment of the polymerization machine (S) shown in FIG. 4) equipped with a jacket for passing a heating (cooling) medium on the outside and composed of a barrel, in which a cross section is of such a form that two circles are partially superposed, and rotational shafts equipped with paddles, trioxane (3) mixed with a molecular weight-controlling agent was continuously fed from the pipe (E) at the upstream end of the polymerization machine (S) while rotating two rotational shafts equipped with paddles at 50 rpm at different directions from each other. Methylal was used as a molecular weight-controlling agent and added in an amount of 0.034% by weight, based on trioxane.

On the other hand, the amount equivalent to 3.0% by weight per trioxane of 1,3-dioxolane (2), heated at 60° C. and diluted with inert nitrogen gas fed form the feed port (H) at the dilution ratio of 1.3 vol/vol, was fed through the pipe (B) and the amount equivalent to 0.0017% by weight per trioxane of boron trifluoride (1) was fed from the feed pipe (A). Both flows were controlled at the same direction in the passageway of the first double pipe (C), and at the linear velocity of 1.6 m/sec through the port end (T) of the internal pipe, into the succeeded mixing and feeding pipe (D) to obtain the mixture (4) by mixing for 0.9 second before contacting trioxane (3) in the poymerization machine. The mixture (4) was heated at 64° C., continuously fed from the feed port (R) to the polymerization machine (S), and then cationic bulk polymerization was continuously conducted.

Continuous operation was carried out for 48 hours to find that polydioxolane liable to be produced in the pipeline, especially in the port end (T), was not observed and the pipeline could be prevented from being clogged. Further, the amounts in feed flow of 1,3-dioxolane (2) and boron trifluoride (1) always showed onstant values, and the polyacetal resin could stably be produced.

The reaction product discharged from the port (F) for discharging a polyacetal resin was treated in the same manner as Example 1, and the catalyst was deactivated. Further, the crushed product was separated, washed and dried, and then a polyacetal resin was obtained. The polymerization yield showed as high value as 80% by weight based on the fed raw materials.

Example 5

According to the schematic process diagram shown in FIG. 5, production of a polyacetal resin was conducted. First, with use of a continuous mixing reactor (an embodiment of the polymerization machine (S) shown in FIG. 5) equipped with a jacket for passing a heating (cooling) medium on the outside and composed of a barrel, in which a cross section is of such a form that two circles are partially superposed, and rotational shafts equipped with paddles, trioxane (3) mixed with a molecular weight-controlling agent was continuously fed from the pipe (E) at the upstream end of the polymerization machine (S) while rotating two rotational shafts equipped with paddles at 50 rpm at different directions from each other. Methylal was used as a molecular weight-controlling agent and added in an amount of 0.034% by weight, based on trioxane.

On the other hand, the amount equivalent to 3.0% by weight per trioxane of 1,3-dioxolane (2), heated at 60° C. and diluted with inert nitrogen gas fed from the feed port (H) at the dilution ratio of 1.8 vol/vol, was fed through the pipe (B), and then the amount equivaqlent to 0.0017% by weight per trioxane of borontrifluoride diluted with inert nitrogen gas fed from the feed port (G) at the dilution ratio of 8.9 vol/vol, was fed from the feed pipe (A). Both flows were controlled at the same direction in the passageway of the first double pipe (C), and at the linear velocity of 4.0 m/sec through the port end (T) of the internal pipe into the succeeded mixing and feeding pipe (D) to obtain the mixture (4) by mixing for 0.3 second before contacting trioxane (3). The mixture was heated at 64° C., continuously fed from the feed port (R) to the polymerization machine (S), and then cationic bulk polymerization was continuously conducted.

Continuous operation was carried out for 48 hours to find that polydioxolane liable to be produced in the pipeline, especially in the port end (T), was not observed and the pipeline could be prevented from being clogged. Further, the amounts in feed flow of 1,3-dioxolane (2) and boron trifluoride (1) always showed constant values, and the polyacetal resin could stably be produced.

The reaction product discharged from the port (F) for discharging a polyacetal resin was treated in the same manner as Example 1, and the catalyst was deactivated. Further, the crushed product was separated, washed and dried, and then a polyacetal resin was obtained. The polymerization yield showed as high value as 80% by weight based on the fed raw materials.

Comparative Example 1

According to the schematic process diagram shown in FIG. 6, production of a polyacetal resin was conducted. First, with use of a continuous mixing reactor (an embodiment of the polymerization machine (S) shown in FIG. 6) equipped with a jacket for passing a heating (cooling) medium on the outside and composed of a barrel, in which a cross section is of such a form that two circles are partially superposed, and rotational shafts equipped with paddles, trioxane (3) mixed with a molecular weight-controlling agent was continuously fed from the pipe (E) at the upstream end of the polymerization machine (S) while rotating two rotational shafts equipped with paddles at 50 rpm at different directions from each other. Methylal was used as a molecular weight-controlling agent and added in an amount of 0.034% by weight, based on trioxane.

On the other hand, the amount equivalent to 3.0% by weight per trioxane of 1,3-dioxolane (2) heated at 60° C. was fed from the feed pipe (B) and the amount equivalent to 0.0017% by weight per trioxane of boron trifluoride (1) was fed from the feed pipe (A). Both flows were controlled at the same direction in the passageway of the first double pipe (C), and at the linear velocity of 1.1 m/sec through the port end (T) of the feed pipe (A), into the succeeded mixing and feeding pipe (D) to obtain the mixture (4) by mixing for 1.2 seconds before contacting trioxane (3). The mixture (4) was heated at 64° C., continuously fed from the feed port (R) to the polymerization machine (S), and then cationic bulk polymerization was continuously conducted.

Continuous operation was carried out for 2 hours to find that the amount in feed flow of boron trifluoride showed zero and the polymerization equipment stopped. The inside of the pipeline was inspected to find that white solid polydioxolane was produced to clog the pipeline.

Comparative Example 2

According to the schematic process diagram shown in FIG. 1, production of a polyacetal resin was conducted in the same manner as Example 1, except that the linear velocity of the mixed flow is 0.05 m/sec. Continuous cationic bulk polymerization was carried out for 8 hours to find that the feed flow amount of boron trifluoride was disordered and that after further 0.5 hour, the amount in feed flow of boron trifluoride showed zero and the polymerization equipment stopped. The inside of the pipeline was inspected to find that white solid polydioxolane was produced to clog the pipeline.

Comparative Example 3

According to the schematic process diagram shown in FIG. 7, production of a polyacetal resin was conducted. First, with use of a continuous mixing reactor (an embodiment of the polymerization machine (S) shown in FIG. 7) equipped with a jacket for passing a heating (cooling) medium on the outside and composed of a barrel, in which a cross section is of such a form that two circles are partially superposed, and rotational shafts equipped with paddles, 1,3-dioxolane (2), trioxane (3) and the mixture (7), without containing a catalyst, comprising a molecular weight-controlling agent were continuously fed from the feed pipe (K) at the upstream end of the polymerization machine (S) while rotating two rotational shafts equipped with paddles at 50 rpm at different directions from each other. Methylal was used as a molecular weight-controlling agent and the mixing ratio of 1,3-dioxolane (2) and methylal was 3.0% by weight and 0.034% by weight, based on trioxane, respectively.

On the other hand, the amount equivalent to 0.0017% by weight per trioxane of boron trifluoride (1) fed from the feed pipe (A) was continuously fed from the internal pipe (L) inside the feed pipe (K) into the polymerization machine (S), and then cationic bulk polymerization was conducted continuously for 36 hours.

The reaction product discharged from the port (F) for discharging a polyacetal resin was treated in the same manner as Example 1, and the catalyst was deactivated. Further, the crushed product was separated, washed and dried, and then a polyacetal resin was obtained. The polymerization yield showed as low value as 72% by weight based on the fed raw materials.

What is claimed is:

1. A process for continuously producing a polyacetal resin, comprising the steps of;
   (1) feeding 1,3-dioxolane and at least one catalyst selected from the group consisting of boron trifluoride and a coordination compound of boron trifluoride separately in the same direction as each other to bring them into contact, and mix them, with each other to obtain a mixture;
   (2) allowing the mixture to continue for a period of 0.1 to 30 seconds at a linear velocity of at least 0.1 m/sec, then
   (3) mixing the obtained mixture with trioxane; and
   (4) conducting bulk-polymerization in polymerization equipment to obtain a copolymer of 1,3-dioxolane and trioxane.

2. The process as claimed in claim 1, wherein step (1) includes feeding either boron trifluoride diluted with an inert gas or the coordination compound of boron trifluoride diluted with an inert solvent.

3. The process as claimed in claim 1, wherein step (1) includes feeding 1,3-dioxolane diluted with an inert gas.

4. The process as claimed in claim 1, in which 1,3-dioxolane is contacted with the catalyst at a temperature of 30 to 100° C.

5. The process as claimed in claim 1, in which the mixture of the step (2) is allowed to continuously flow at a temperature of 20 to 100° C. at a linear velocity of 0.3 to 10 m/sec for a period of 0.1 to 5 seconds.

6. The process as claimed in claim 1, wherein step (3) includes adding the mixture to trioxane fed to the polymerization equipment.

7. The process as claimed in claim 1, in which the polymerization equipement is a continuous-wise mixing reactor having biaxial twin screws which rotate at different directions from each other.

8. The process as claimed in claim 1, wherein step (1) is practiced using internal and external pipes aligned with one another such that the external pipe surrounds the internal pipe, and wherein the catalyst is fed through the internal pipe and the 1,3-dioxolane is fed through the external pipe.

9. The process as claimed in claim 8, wherein the external pipe extends to a feed port associated with the polymerization equipment, and wherein the internal pipe terminates within the external pipe at a discharge port thereof which is spaced from the feed port, and wherein the 1,3-dioxolane and said at least one catalyst contact and mix with one another between said discharge and feed ports.

10. The process as claimed in claim 1, wherein step (1) is practiced using internal and external pipes aligned with one another such that the external pipe surrounds the internal pipe, and wherein the mixture of the 1,3-dioxolane and the at least one catalyst is fed through the internal pipe and the trioxane is fed through the external pipe.

11. The process as claimed in claim 10, wherein said internal and external pipes both terminate at a feed port associated with the polymerization equipment.

* * * * *